United States Patent
Lee et al.

(10) Patent No.: US 11,484,817 B1
(45) Date of Patent: Nov. 1, 2022

(54) FILTER ASSEMBLY CAPABLE OF ADJUSTING ELIMINATION OF SOLID MATERIALS USING FLOW-VARIABLE BYPASS FLOW PATH

(71) Applicant: Microfilter co., Ltd., Chungcheongbuk-do (KR)

(72) Inventors: Hyun Woo Lee, Gyeongsangbuk-do (KR); Dae Yeon Cho, Chungcheongbuk-do (KR); Bo Kyoung Chae, Seoul (KR); Dong Hyun Kim, Gyeonggi-do (KR); Whi Dong Joung, Seoul (KR)

(73) Assignee: Microfilter co., Ltd., Chungcheongbuk-do (KR)

( * ) Notice: Subject to any disclaimer, the term of this patent is extended or adjusted under 35 U.S.C. 154(b) by 5 days.

(21) Appl. No.: 17/231,160

(22) Filed: Apr. 15, 2021

(51) Int. Cl.
*B01D 27/10* (2006.01)
*B01D 35/30* (2006.01)
*C02F 1/00* (2006.01)

(52) U.S. Cl.
CPC ......... *B01D 27/103* (2013.01); *B01D 27/108* (2013.01); *B01D 35/30* (2013.01); *C02F 1/001* (2013.01); *C02F 1/008* (2013.01); *B01D 2201/302* (2013.01); *C02F 2201/006* (2013.01); *C02F 2209/40* (2013.01)

(58) Field of Classification Search
CPC .... B01D 27/103; B01D 27/108; B01D 35/30; B01D 2201/302; C02F 1/001; C02F 1/008; C02F 2201/006; C02F 2209/40
See application file for complete search history.

(56) References Cited

FOREIGN PATENT DOCUMENTS

| KR | 10-2010-0109156 A | 10/2010 | |
|---|---|---|---|
| KR | 10-2018-0050039 A | 5/2018 | |
| KR | 10-2020-0128302 A | 11/2020 | |
| WO | WO-2014006127 A1 * | 1/2014 | ............. C02F 1/008 |

* cited by examiner

*Primary Examiner* — Terry K Cecil
(74) *Attorney, Agent, or Firm* — Harness, Dickey & Pierce, P.L.C.

(57) ABSTRACT

Disclosed is a filter assembly capable of adjusting elimination of solid materials using a flow-variable bypass flow path. The filter assembly includes a filter portion (100) which includes a cover portion (110) formed on top to have a shape in which a bypass flow pipe (112) and a water discharge pipe (113) sequentially surrounds a perimeter of a vertically protruding original water inflow pipe (111) in a stepped structure and accommodates a filter body therein and a filter cartridge header (200) in which the cover portion (110) of the filter portion (100) is accommodated therebelow and which includes a bypass flow rate control unit (300) capable of adjusting an inflow amount of original water flowing into the bypass flow pipe (112).

10 Claims, 11 Drawing Sheets

FILTER ASSEMBLY CAPABLE OF ADJUSTING ELIMINATION OF SOLID MATERIALS USING FLOW-VARIABLE BYPASS FLOW PATH

FIELD

The present invention relates to a filter assembly capable of adjusting elimination of solid materials using a flow-variable bypass flow path, and more particularly, a filter assembly in which a flow-variable bypass flow path is formed in a filter head so as to adjust a percentage of solid materials such as calcium (Ca) ions, magnesium (Mg) ions, and the like included in original water.

BACKGROUND

Recently, as environmental pollution (or contamination), particularly, water pollution (or contamination) has become a social issue, use of purifiers which physically or chemically filters impurities from water has increased.

Such purifiers each include a variety of filters such as a precipitation filter, a carbon filter, a membrane filter, and the like connected and installed therein such that water undergoes a physical or chemical process while passing through such filters to be purified.

Here, a precipitation filter performs a function of primarily filtering out impurities such as sand, heavy metals, and the like included in a fluid (water). A pre-carbon filter performs a function of adsorbing and removing a chlorine (Cl) chemical, trihalomethane, and organic chemicals, and the like dissolved in a fluid. A membrane filter is an essential filter of a purifier and performs a function of ultimately filtering foreign substances including heavy metals, viruses, bacterium, organic chemicals, and the like using a reverse osmosis method through an ultraprecision semipermeable membrane.

Also, a structure of a general filter includes an inlet into which water is injected and an outlet through which the water is discharged in a head of the filter such that a connecting tube is coupled to each of the inlet and the outlet and water supplied from a water source is purified and supplied to a water tank of the purifier.

Meanwhile, in the case of a reverse osmosis membrane filter, water purification is performed by artificially applying a pressure to a thick side such that water that is a solvent in a thick solution passes through an osmosis membrane and moves toward a weak side.

Although such a reverse osmosis membrane filter is capable of eliminating ionic materials such as calcium (Ca) ions and magnesium (Mg) ions which cause forming of scale, a high-pressure environmental condition is necessary for reverse osmosis, a carbon-pretreatment filter is necessary for preventing a membrane from being damaged by Cl, and it is difficult to satisfy customers due to an amount of purified water in comparison to that of original water.

To solve such problems, a filter assembly according to a related art includes a solid material elimination means in a filter housing which accommodates a filter body. However, a structure of the filter housing becomes complicated and the number of additional components increases such that manufacturing processes and manufacturing costs increase.

Also, recently, customers who would like to adjust contents of solid materials such as metal ions including Ca ions, Mg ions, and the like in purified water rather than to completely eliminate such solid materials from original water have increased. However, although the filter assembly according to the related art is capable of eliminating such solid materials using the solid material elimination means, it is impossible to adjust contents thereof.

To overcome such a limitation, attempts for adding an adjusting means to the solid material elimination means installed in the filter housing have been made. However, it is difficult to perform installation due to a complicated internal structure of the filter housing, and manufacturing costs increase due to an increase in the number of components.

Accordingly, a technology related to a practical and applicable filter assembly capable of adjusting contents of solid materials while reducing manufacturing costs has been desperately needed.

RELATED ART DOCUMENT

Patent Document (Patent Document 0001) Korean Patent Publication No. 10-2010-0109156 (published on Oct. 8, 2010)

SUMMARY

The present invention is directed to providing a filter assembly capable of adjusting a content of solid materials such as Ca ions, Mg ions, and the like included in original water by forming a flow-variable bypass flow path in a filter cartridge header and additionally forming a flow path directly passing through a Cl elimination filter without passing a solid material elimination filter corresponding to the bypass flow path in addition to a flow path basically configured to sequentially pass through a solid material elimination filter and the Cl elimination filter in a filter portion.

One aspect of the present invention provides a filter assembly capable of adjusting elimination of solid materials using a flow-variable bypass flow path. The filter assembly includes filter portion (100) which includes a cover portion (110) formed on top to have a shape in which a bypass flow pipe (112) and a water discharge pipe (113) sequentially surrounds a perimeter of a vertically protruding original water inflow pipe (111) in a stepped structure and accommodates a filter body therein and a filter cartridge header (200) in which the cover portion (110) of the filter portion (100) is accommodated therebelow and which includes a bypass flow rate control unit (300) capable of adjusting an inflow amount of original water flowing into the bypass flow pipe (112).

The filter cartridge header (200) may include an upper header (201) which includes a hollow portion forming an inlet portion (210) and an outlet portion (220) in one side and the other side and passes through an inside, a lower header (202) which includes one or more bypass inlet holes (202a) formed as inflow paths of the original water flowing into the bypass flow pipe (112) on a periphery of a central hole (203) coupled to a bottom of the upper header (201) to pass therethrough, and the bypass flow rate control unit (300) in which an inflow amount of the original water flowing into the bypass flow pipe (112) is adjusted stage by stage by adjusting an opening range of the bypass inlet holes (202a) by operating a rotational opening or closing dial (320) coupled in a structure sequentially passing through the upper header (201) and the lower header (202) and formed to be exposed in a lid shape outside a top end.

The bypass flow rate control unit (300) adjusts an amount of original water flowing into the one or more bypass inlet holes (202a) formed inside the lower header (202) by controlling a rotational radius of the rotational opening or closing dial (320).

The bypass flow rate control unit (300) may include a flow rate adjusting housing (310) which has a top end passing through the upper header (201) and a bottom end located in a place at which the bypass inlet holes (202a) of the lower header are formed, a rotational opening or closing dial (320) disposed above the upper header (201) and coupled to the top end of the flow rate adjusting housing (310), and a housing supporting spring (330) formed on a periphery of an outer surface of the flow rate adjusting housing (310) and having a repulsive force against inner surfaces of the upper header (201) and the lower header (202).

The flow rate adjusting housing (310) may include communication holes (311a, 311b) formed on a side surface to communicate with the inlet portion (210) formed in the upper header (201) to allow original water to flow therein, a housing blocking member (312) formed on a bottom end surface and capable of preventing the bypass inlet holes (202a) formed in the lower header (202) stage by stage corresponding to a rotational operation of the opening or closing dial (320), and a rotation power transfer portion (313) formed at a top end to receive rotational movement of the opening or closing dial (320).

To couple the upper (201) to the lower header (202), the filter assembly may include a coupling hole portion (201a) formed on an outer surface of a bottom end of the upper header (201) and a coupling protruding portion (202b) formed to protrude from a side surface of the lower header (202).

The upper header (202) may include a pair of stoppers (232) formed on an edge of a top surface to perform a holding operation at a uniform interval corresponding to an inner surface of the opening or closing dial (320) and a header-center pipe (231) which is formed to vertically protrude from a central part of the top surface and to form a power transfer space therein for the opening or closing dial (320) and the flow rate adjusting housing (310) and includes a holding protrusion (233a) and a holding step (233b) corresponding to a push operation and a pull operation of the opening or closing dial (320).

The opening or closing dial (320) may include a grip cover (322) which has a lid-shaped exterior and in which a plurality of stopper-corresponding grooves are formed along an inner surface to perform the holding operation of the stoppers (232) and grip slits are formed at certain intervals on an outer surface, an insertion portion (321) formed in a vertically downward direction at a central part of an inside of the grip cover (322) to have a tubular shape and inserted into and fixed to the rotation power transfer portion (313) of the flow rate adjusting housing (310), a holding hook (323), corresponding to the holding protrusion (233a) and the holding step (233b) formed on the header-center pipe (231) of the upper header (201), fixed to the holding protrusion (233a) when the push operation is performed and held by the holding step (233b) and prevented from being externally separated when the pull operation is performed, and a rotation prevention member (324) vertically disposed between the holding hook (323) and the grip cover (322) to come into contact with and prevent the stoppers (232) from rotating in the push operation.

The filter portion (100) may include a Cl elimination filter (130) on top and a solid material elimination filter (140) on bottom.

The filter portion (100) may include a first flow path formed such that original water flowing through the original water inflow pipe (111) sequentially passes through the solid material elimination filter (140) and the Cl elimination filter (130) and a second flow path formed such that the original water flowing through the bypass flow pipe (112) directly passes through the Cl elimination filter (130) without passing the solid material elimination filter (140).

When the inflow amount of the original water flowing into the bypass flow pipe (112) is adjusted using the bypass flow rate control unit (300), a flow rate ratio between the first flow path and the second flow path may be adjusted so as to adjust Ca and Mg contents.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Since a following description of the present invention merely corresponds to embodiments for describing a structure and functions of the present invention, the scope of the present invention should not be construed as being restricted by the embodiments described below. That is, since a variety of changes and a variety of shapes of the embodiments may be made, it should be understood that the scope of the present invention includes equivalents capable of implementing the technical concept thereof.

Meanwhile, the meaning of the terms described herein should be understood as follows.

The terms "first," "second," and the like are intended to distinguish one component from another component, and the scope of the present invention should not be limited to the terms. For example, a first component may be designated as a second component, and similarly, the second component may be designated as the first component.

When it is stated that one component is "connected" to another component, it should be understood that the one component may be directly connected to the other component but another component may be present therebetween. On the other hand, when it is stated that one component is "directly connected" to another component, it should be understood that no other component is present therebetween. Meanwhile, other expressions for describing a relationship between components, that is, "between," "directly between," "adjacent to," "directly adjacent to," and the like should also be equally construed.

It should be understood that singular expressions, unless clearly defined otherwise in the text, include plural expressions. Also, it should be understood that the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Identification codes (for example, a, b, c, and the like) in stages are used for convenience of description and do not describe an order of components. Also, the stages may be performed unlike a specified order unless a particular order is clearly defined in the text. That is, the stages may be performed equal to the specified order, be performed substantially at the same time, or be performed in a reverse order.

All the terms used herein, unless defined otherwise, have the same meanings generally understood by one of ordinary skill in the art. Generally, terms defined in generally used dictionaries should be construed as having the meanings which coincide with contextual meanings in the art and cannot be construed as having ideal or excessively formal meanings unless clearly defined herein.

Hereinafter, the embodiments of the present invention will be described in detail with reference to the attached drawings.

Figure 1:
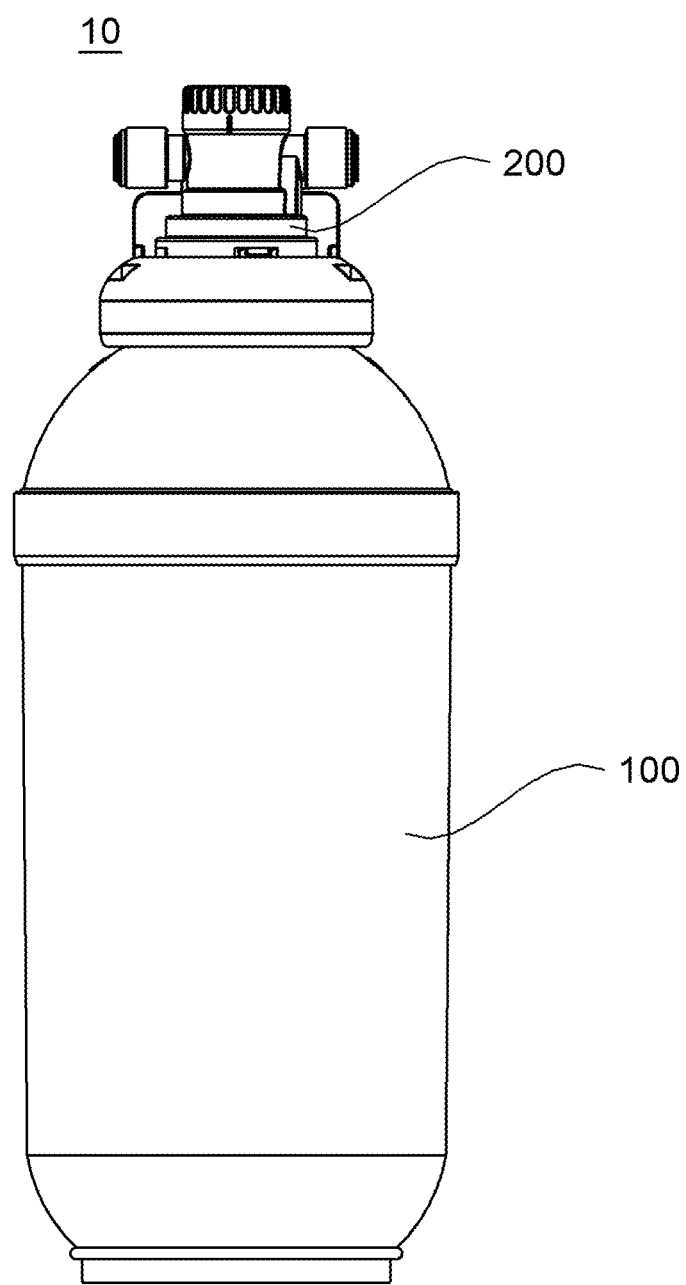
FIG. 1 is a view illustrating external components of a filter assembly capable of adjusting elimination of solid materials using a flow-variable bypass flow path according to an embodiment of the present invention.
Figure 2A:
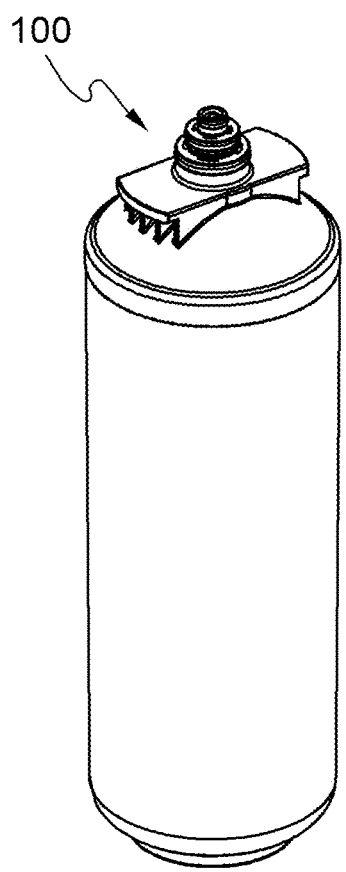
FIGS. 2A and 2B are views schematically illustrating an upper structure in a filter portion included in the filter assembly shown in FIG. 1.
Figure 2B:
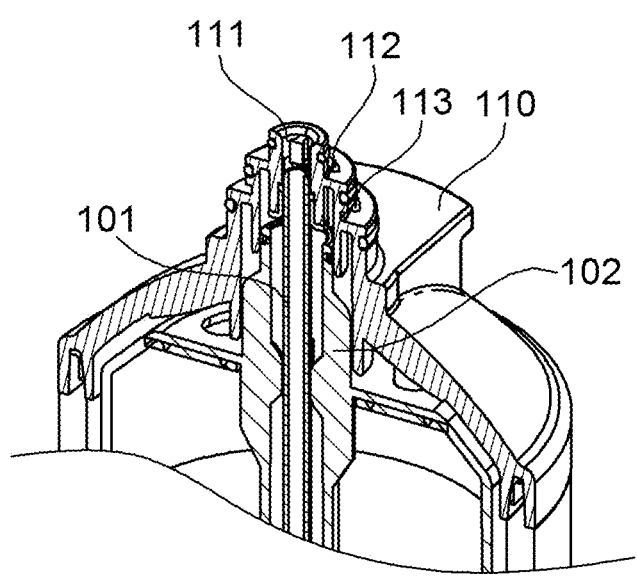

FIG. 1 is a view illustrating external components of a filter assembly capable of adjusting elimination of solid materials using a flow-variable bypass flow path according to an embodiment of the present invention, and FIGS. 2A and 2B are views schematically illustrating an upper structure in a filter portion included in the filter assembly shown in FIG. 1.

As shown in the drawings, a filter assembly 10 capable of adjusting elimination of solid materials using a flow-variable bypass flow path according to the embodiment may include a filter portion 100 and a filter cartridge header 200.

In more detail, the filter portion 100 may include a cover portion 110 on top which has a shape in which a bypass flow pipe 112 and a water discharge pipe 113 sequentially surrounds a vertically protruding original water inflow pipe 111 in a stepped structure and may accommodate a filter body therein.

In the embodiment of the present invention, the filter body may be formed while a region, in which a filter configured to eliminate solid materials such as calcium (Ca) and magnesium (Mg) dissolved in original water is located, and a region, in which a filter configured to eliminate chlorine (Cl) dissolved in original water is located, are distinguished from each other.

Also, the filter cartridge header 200 may include a filter accommodation pipe on bottom, in which a cover portion 110 of the filter portion 100 is accommodated, and a bypass flow rate control unit 300 capable of adjusting a flow rate of original water which flows into the bypass flow pipe 112.

Next, the bypass flow rate control unit 300 included in the filter assembly according to the embodiment of the present invention will be described as follows with reference to FIGS. 3 to 6.

Figure 3:
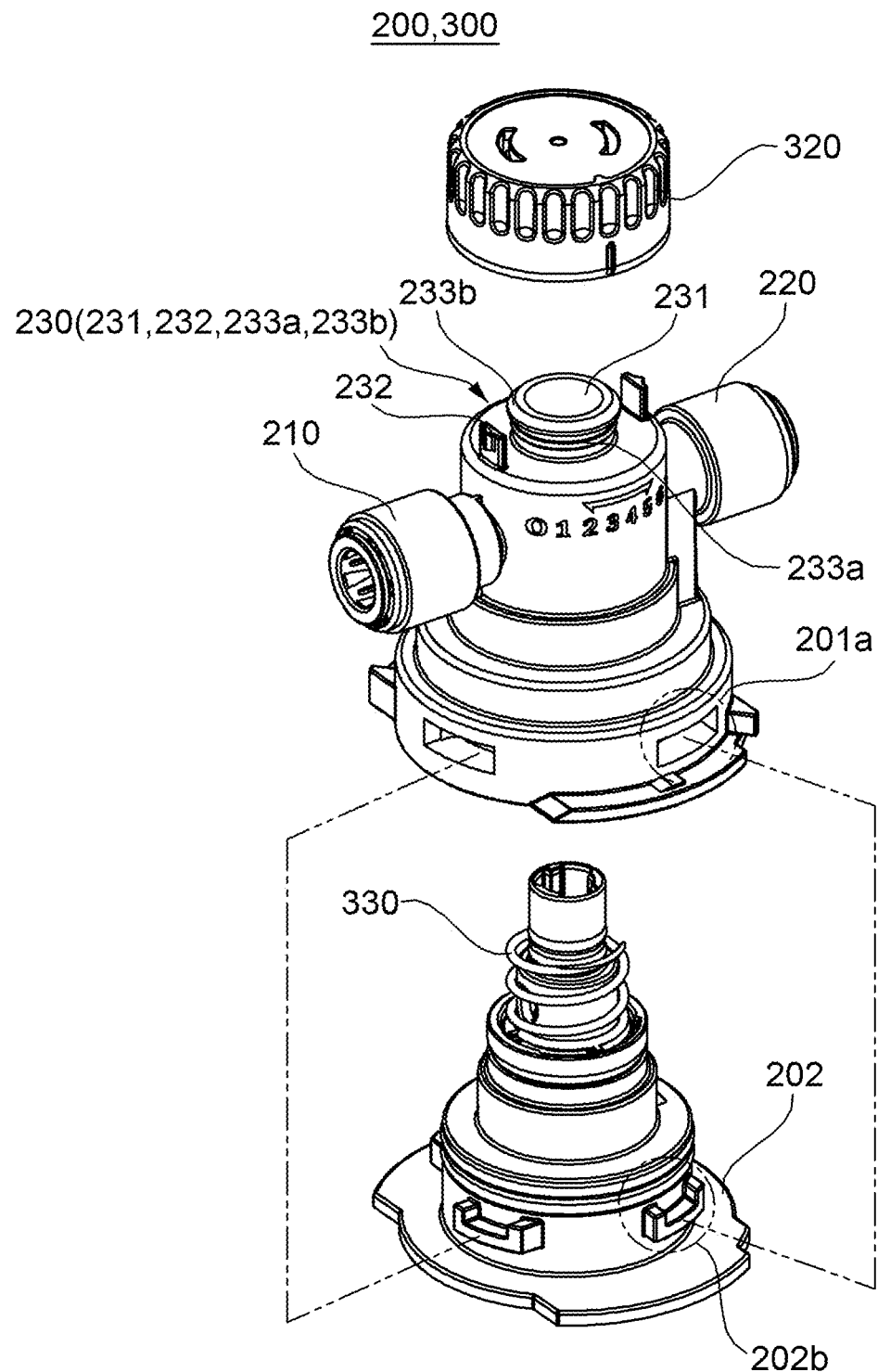
FIGS. 3, 4A, 4B, 5 and 6 are views illustrating a coupling structure of a filter cartridge header included in the filter assembly shown in FIG. 1 in detail.
Figure 4A:
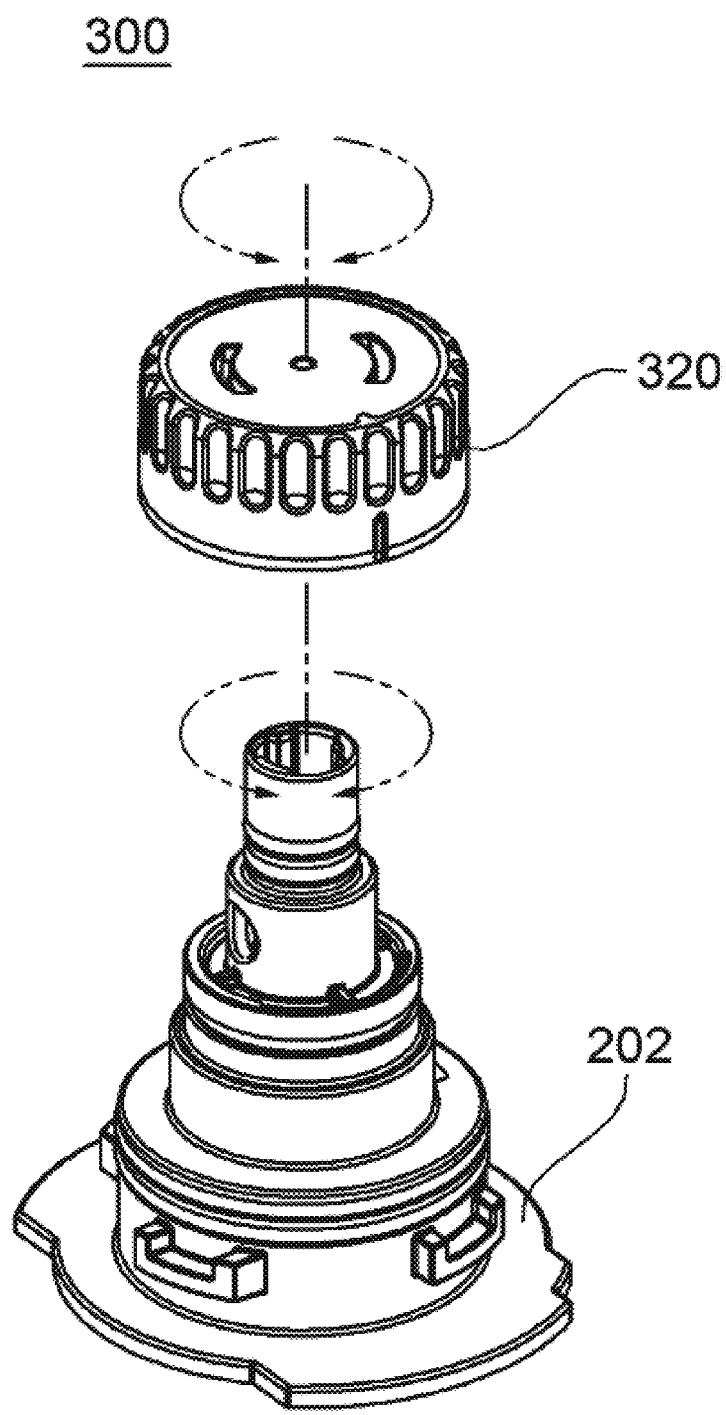
Figure 4B:
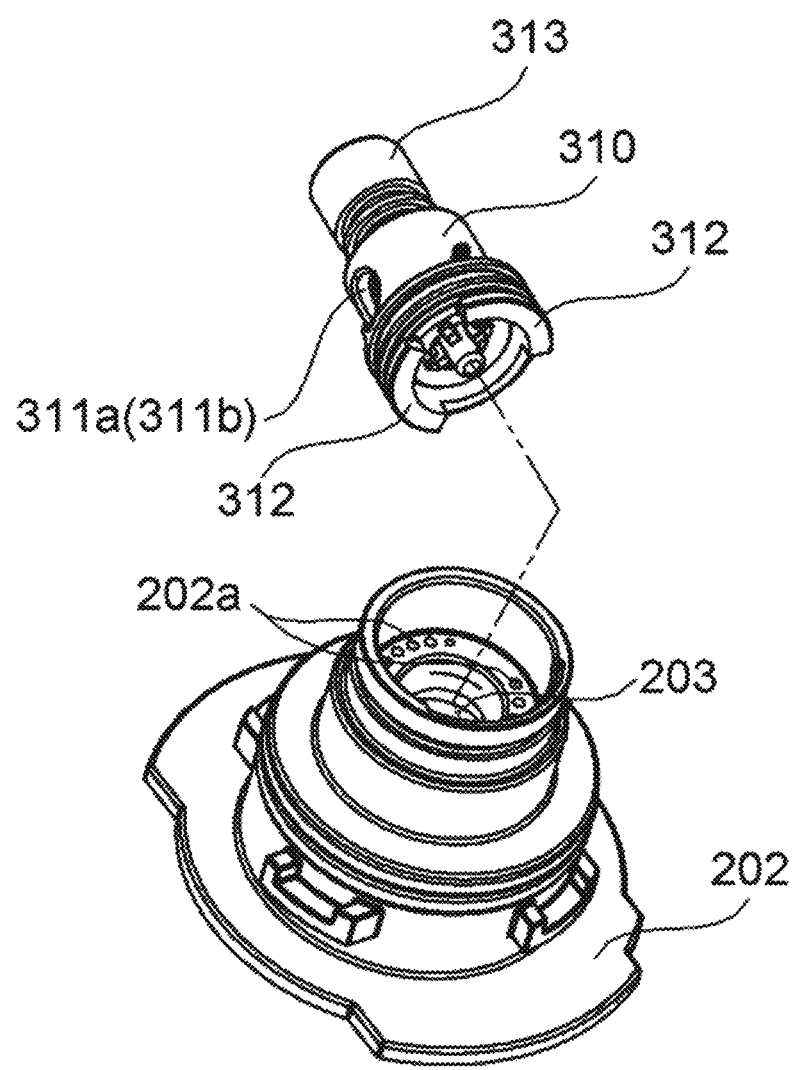
Figure 5:
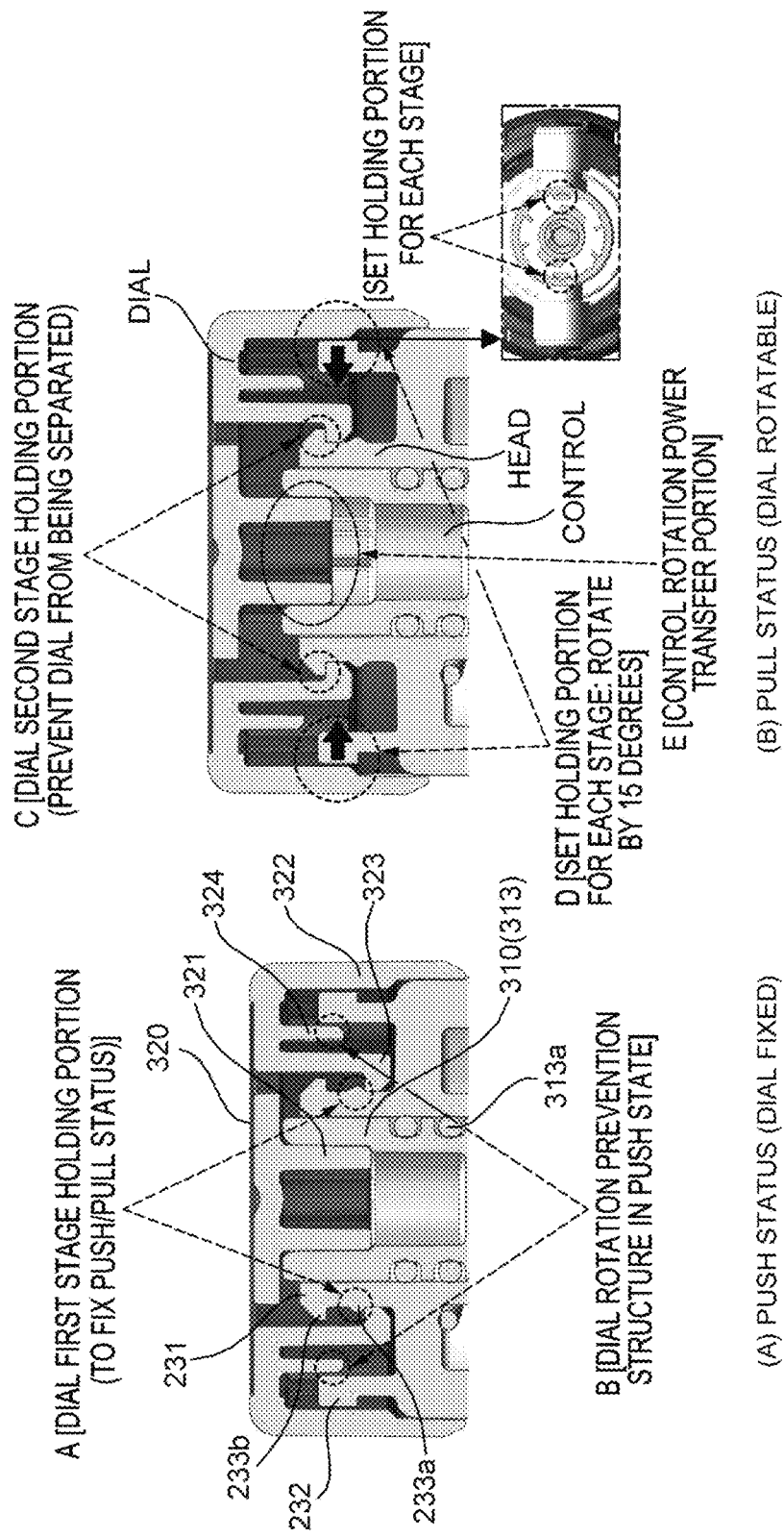
Figure 6:
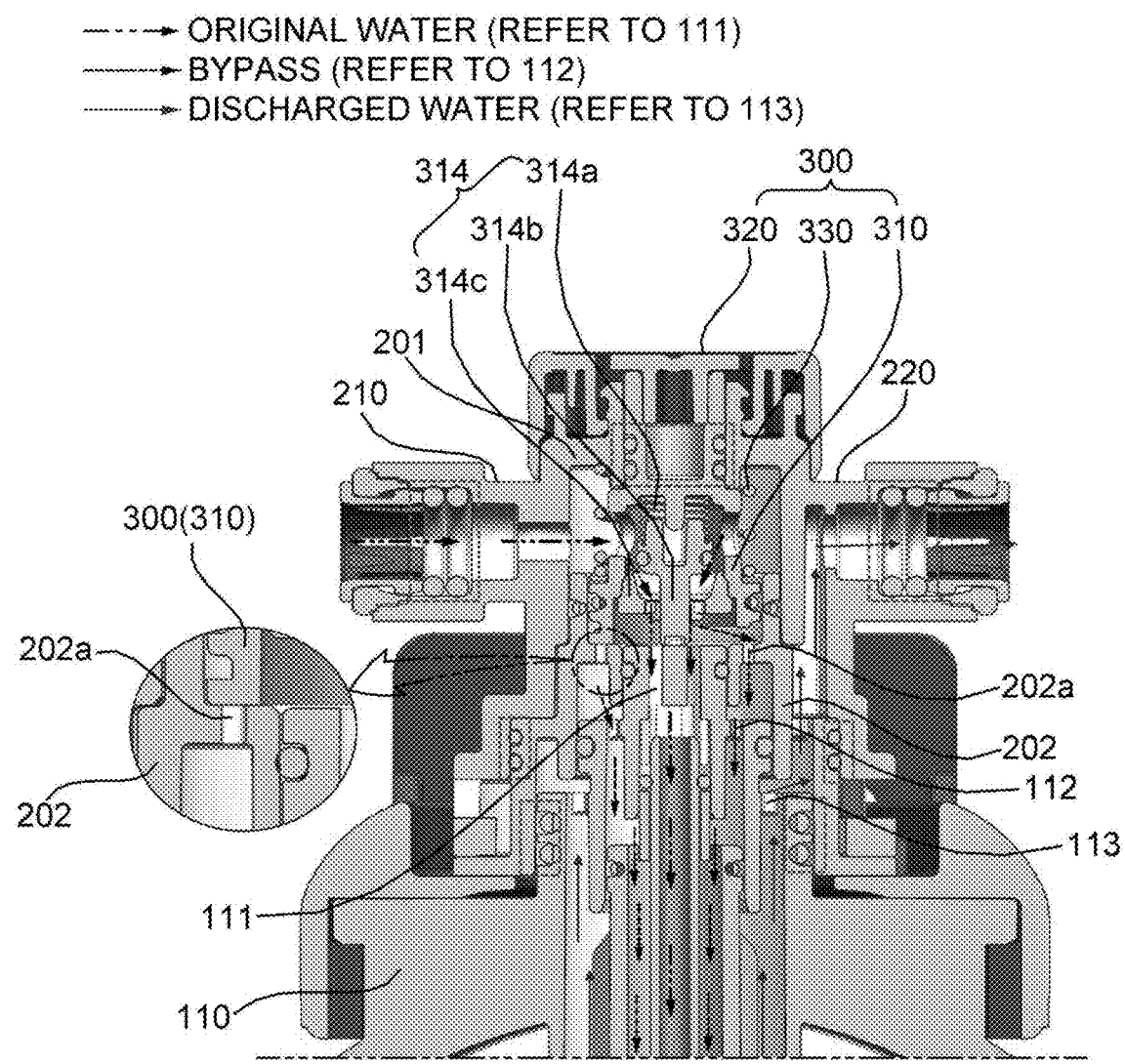

FIGS. 3 to 5 are views illustrating a coupling structure of the filter cartridge header included in the filter assembly shown in FIG. 1 in detail, and FIG. 6 is a cross-sectional view illustrating a coupling structure between the filter cartridge header and the filter portion.

As shown in the drawings, the filter cartridge header 200 included in the filter assembly according to the embodiment of the present invention may include an upper header 201, a lower header 202, and the bypass flow rate control unit 300.

In more detail, the upper header 201 may include a hollow part which forms an inlet portion 210 and an outlet portion 220 on one side and the other side and passes through an inside.

Here, the inlet portion 210 may be a component which includes an inlet formed on one side and forms an original water inflow path for supplying original water to the original water inflow pipe 111

Also, the outlet portion 220 may include an outlet formed on the other side facing the inlet of the inlet portion 210 and include a water discharge path which communicates with the water discharge pipe 113 so as to discharge water which passes through the filter body and is purified.

Also, the lower header 202 may include at least one bypass inlet hole 202a formed as an inflow path of original water flowing into the bypass flow pipe 112 on a periphery of a central hole 203 coupled to a bottom of the upper header 201 and passing through an inside.

Also, in the bypass flow rate control unit 300, an opening range of the inlet hole 202a may be adjusted by operating a rotational opening or closing dial 320 coupled in a structure which sequentially passes through the upper header 201 and the lower header 202 and formed to be exposed as a lid shape outside a top end so as to adjust an inflow rate of original water flowing into the bypass flow pipe 112 stage by stage.

Here, the bypass flow rate control unit 300 may adjust an amount of original water flowing into one or more bypass inlet holes 202a formed inside the lower header 202 by controlling a rotational radius of the rotational opening or closing dial 320.

The bypass flow rate control unit 300 according to the embodiment of the present invention will be described as follows with reference to FIGS. 3 and 4.

As shown in the drawings, in the embodiment of the present invention, the bypass flow rate control unit 300 may include a flow rate adjusting housing 310, the rotational opening or closing dial 320, and a housing supporting spring 330.

In more detail, the flow rate adjusting housing 310 may include a top end passing through the upper header 201 and a bottom end located at a place at which the bypass inlet hole 202a is formed.

Also, the rotational opening or closing dial 320 may be coupled to the top end of the flow rate adjusting housing 310 while being disposed above the upper header 201.

Also, the housing supporting spring 330 may be formed on a perimeter of an outer surface of the flow rate adjusting housing 310 and perform as an additional spring so as to improve a sealing force of the bypass inlet hole.

Meanwhile, as shown in the drawings, according to the embodiment of the present invention, to couple the upper header 201 with the lower header 202, a coupling hole portion 201a formed in an outer surface of a bottom end of the upper header 201 and a coupling protruding portion 202b formed to protrude from a side surface of the lower header 202 may be included.

A coupling structure of the flow rate adjusting housing and the opening or closing dial according to the embodiment of the present invention will be described as follows with reference to FIGS. 5 and 6.

As shown in the drawings, according to the embodiment of the present invention, the flow rate adjusting housing 310 included in the bypass flow rate control unit 300 is formed as a cylindrical housing with a sidewall surface, which vertically partitions a whole into top and bottom, formed in at a center, and includes a fastening device 314 which forms a flow path for an original water inflow below the sidewall surface and is fastened to the original water inflow pipe 111 of the filter portion 100 with a watertight structure.

Here, as shown in the drawings, the fastening device 314 may include a header spring 314a configured to automatically cut off original water when the filter portion 100 is separated from the filter cartridge header 200, a fastening shaft 314b having a sealed O-ring at an end and insertion-fastened to the original water inflow pipe 111, and a fastening collar 314c configured to tighten and fix a perimeter of the fastening shaft 314b inside a bottom end not to prevent original water from leaking.

Also, the flow rate adjusting housing 310 may include communication holes 311a and 311b, a housing blocking member 312, and a rotation power transfer portion 313.

In more detail, the communication holes 311a and 311b may be formed in a side surface of the flow rate adjusting housing 310 to communicate with the inlet portion 210 formed at the upper header 201 such that original water flows thereinto.

Also, the housing blocking member 312 may be formed on a bottom end surface of the flow rate adjusting housing 310 to block the bypass inlet hole 202a formed in the lower header 202 stage by stage corresponding to a rotating operation of the opening or closing dial 320.

Also, the rotation power transfer portion 313 may be formed at the top end of the flow rate adjusting housing 310 and receive rotational movement of the opening or closing dial 320.

Next, before describing components of the opening or closing dial 320, referring to the drawings, the upper header 201 included in the filter cartridge header 200 according to the embodiment of the present invention may include a pair of stoppers 232 and a header-center pipe 231.

Here, the pair of stoppers 232 may be formed on an edge of an upper surface of the upper header 201 to perform a holding operation at a uniform interval corresponding to an inner surface of the opening or closing dial 320.

Also, the header-center pipe 231 may be formed to vertically protrude in a central part of the upper surface, form a power transfer space therein for the opening or closing dial 320 and the flow rate adjusting housing 310, and include a holding protrusion 233a and a holding step 233b corresponding to a push operation and a pull operation of the opening or closing dial 320 on an outer surface thereof.

In the embodiment of the present invention, as shown in the drawings, the opening or closing dial 320 may include a grip cover 322, an insertion portion 321, a holding hook 323, and a rotation prevention member 324.

In more detail, the grip cover 322 may have a lid-shaped exterior and include a plurality of stopper-corresponding grooves formed at certain interval along an inner surface to perform the holding operation of the stoppers 232 and grip slits formed at a certain interval on an outer surface.

Also, the insertion portion 321 may have a tubular shape in a central part of an inside of the grip cover 322, be formed in a vertically downward direction, and be inserted into and fixed to the rotation power transfer portion 313 of the flow rate adjusting housing 310.

Also, the holding hook 323 may be fixed to the holding protrusion 233a when the push operation is performed corresponding to the holding protrusion 233a and the holding step 233b formed on the header-center pipe 231 of the upper header 201 and be fixed to and may be held by the holding step 233b and prevented from externally separated when the pull operation is performed.

Also, the rotation prevention member 324 may be vertically disposed between the holding hook 323 and the grip cover 322 and come into contact with and prevent the stoppers 232 from rotating when the push operation is performed.

As described above, referring to FIG. 5 for reference numerals A and B, when the opening or closing dial 320 performs the push operation, the insertion portion 321 is inserted into the rotation power transfer portion 313 of the flow rate adjusting housing 310 such that the holding hook 323 may be fixed to the holding protrusion 233a formed on the header-center pipe 231 of the upper header 201 and the rotation prevention member 324 may come into contact with and prevent the stoppers 232 of the upper header 201 from rotating.

Also, referring to FIG. 5 for reference numeral C, while the opening or closing dial 320 performs a pull-up operation of releasing first a fixed state to adjust a flow rate of the bypass flow path, when the grip cover 322 is lifted while being gripped, the insertion portion 321 moves toward the rotation power transfer portion 313 of the flow rate adjusting housing 310 such that the holding hook 323 may be held by the holding step 233b formed on the header-center pipe 231 of the upper header 201.

Also, like reference numeral D, according to the embodiment of the present invention, to adjust of the flow rate of the bypass flow path, when the grip cover 322 of the opening or closing dial 320 is gripped and rotated, the stoppers 232 formed on the edge of the upper surface of the upper header 201 perform the holding operation at a uniform interval from the inner surface of the opening or closing dial 320 and rotate Next, like reference numeral E, as rotational movement of the opening or closing dial 320 is transferred through the rotation power transfer portion 313 formed on the top end of the flow rate adjusting housing 310, the housing blocking member 312 formed on the bottom end surface of the flow rate adjusting housing 310 may block the bypass inlet hole 202a formed in the lower header 202 corresponding to a rotational operation of the opening or closing dial 320.

Figure 7:
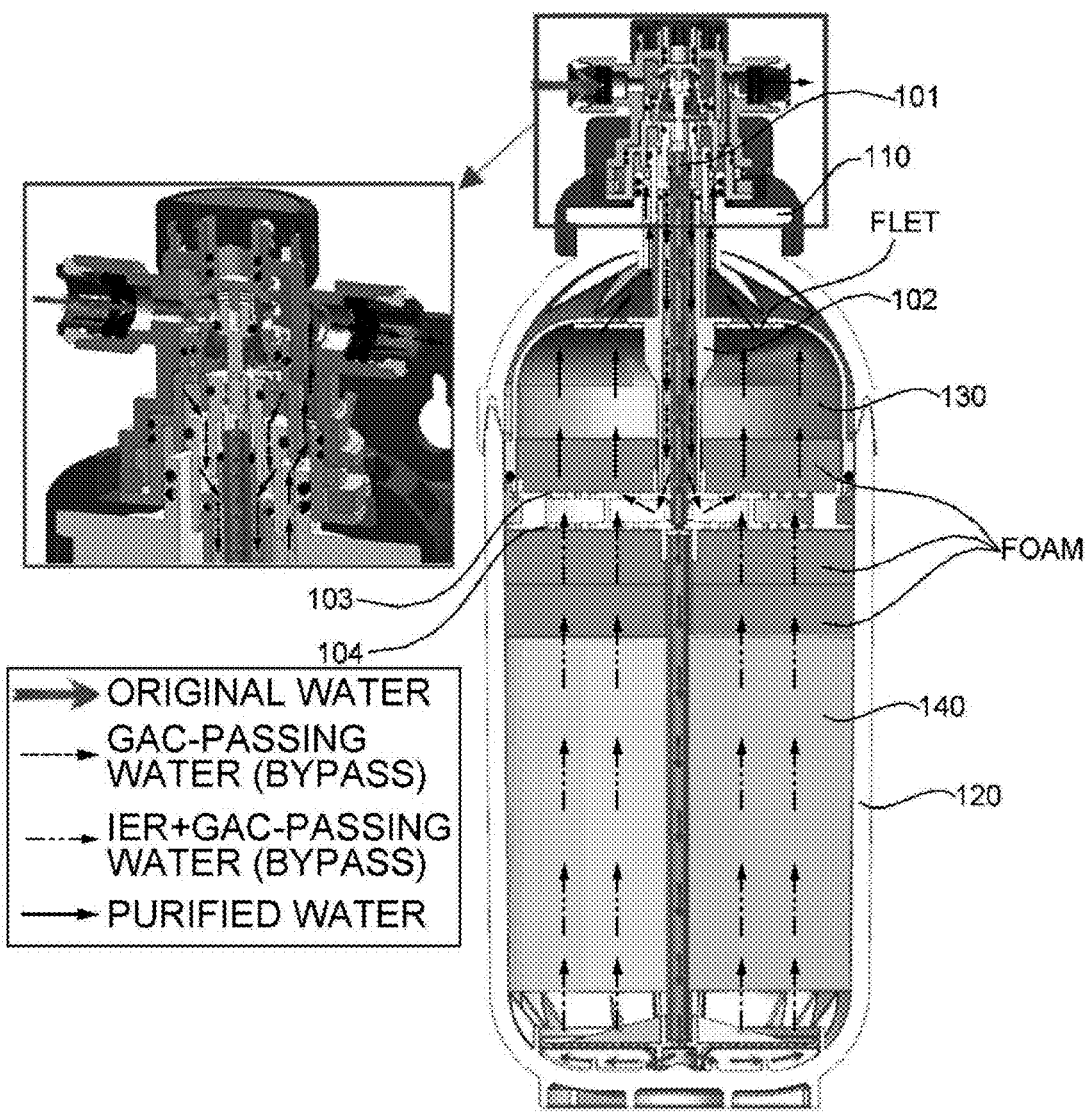
FIG. 7 is a view schematically illustrating an inside of the filter portion included in the filter assembly shown in FIG. 1.

FIG. 7 is a view schematically illustrating an inside of the filter portion included in the filter assembly shown in FIG. 1.

As shown in FIG. 7, the filter portion 100 included in the filter assembly capable of adjusting elimination of solid materials using a flow-variable bypass flow path may include the cover portion 110 on top which has a shape in which the bypass flow pipe 112 and the water discharge pipe 113 sequentially surround the vertically protruding original water inflow pipe 111 in a stepped structure and may include a filter housing 120 on bottom which accommodates the filter body.

Here, as shown in the drawings, in the filter portion 100, interposing the bypass flow path communicating with the bypass flow pipe 112 therebetween, a Cl elimination filter 130 may be located on top inside the filter housing 120 and a solid material elimination filter 140 may be located on bottom inside the filter housing 120.

Also, as shown in the drawings, to form the bypass flow path, the filter portion 100 may include an original water inflow tube 101 communicating with the original water inflow pipe 111 and a flow path disc 102 which is located to allow the original water inflow tube 101 to vertically pass through a central part thereof and forms regions internally and externally communicating with the bypass flow pipe 112 and the water discharge pipe 113.

Here, for a watertight structure of the bypass flow path formed by the flow path disc 102, the filter portion 100 may include a circular upper disc 103 disposed on a perimeter of a bottom end of the flow path disc 102 and a circular lower disc 104 disposed on a perimeter of a bottom end of the original water inflow tub 101 and further include a main tube 105 coupled to a lower end of the original water inflow tube 101 and disposed to pass through the solid material elimination filter 140.

According to the embodiment of the present invention, since original water flowing through the original water inflow pipe 111 passes through the original water inflow tube 101 and the main tube 105, consequently, a first flow path sequentially passing through the solid material elimination filter 140 and the Cl elimination filter 130 is basically formed. Since the original water flowing through the bypass flow pipe 112 passes only the Cl elimination filter 130 between the upper disc 103 and the lower disc 104 outside the original water inflow tube 102 due to the flow disc 102, a second flow path directly passing through the Cl elimination filter 130 without passing through the solid material elimination filter 140 may be additionally formed.

Figure 8:
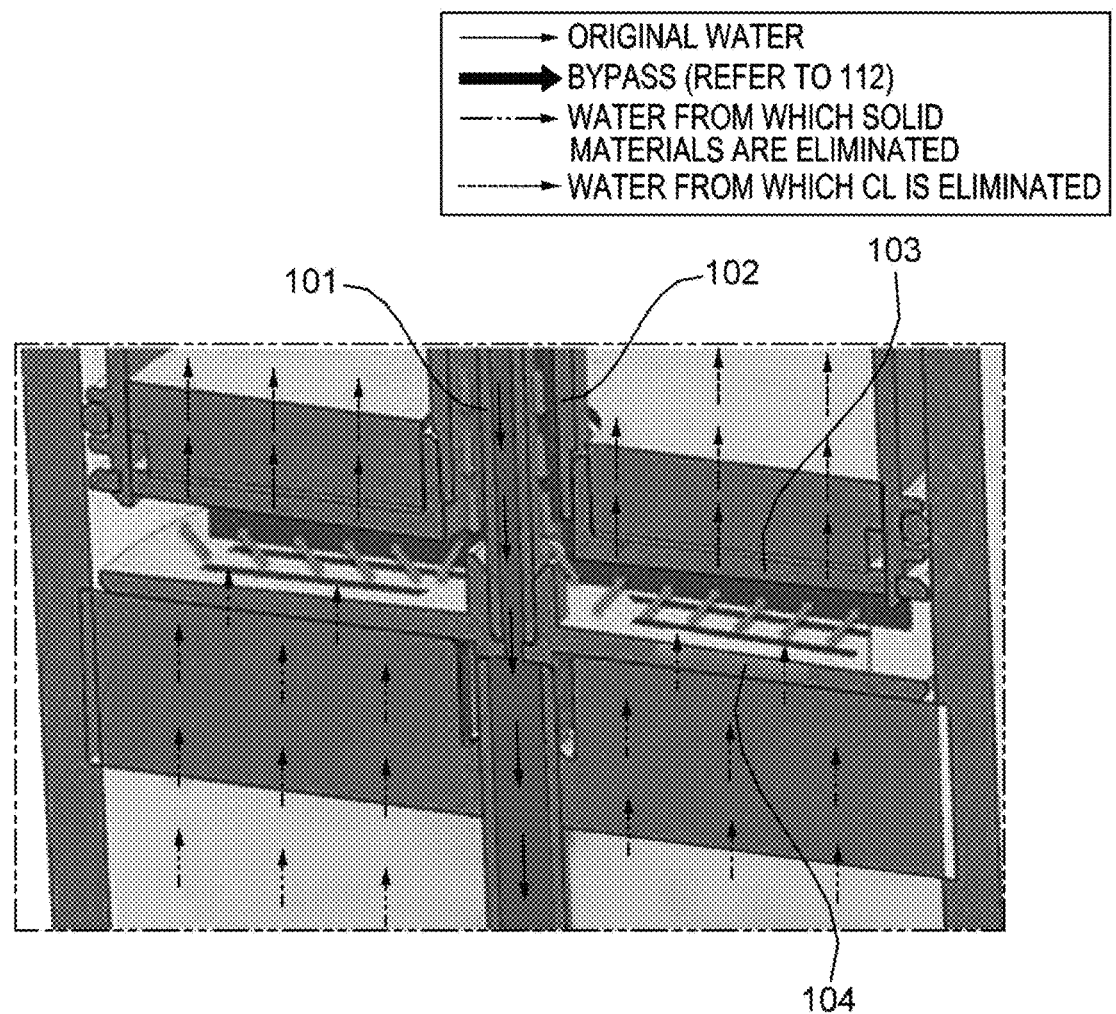
FIG. 8 is a view illustrating a bypass flow path formed in a filter assembly capable of adjusting elimination of solid materials using a flow-variable bypass flow path according to an embodiment.
Figure 9:
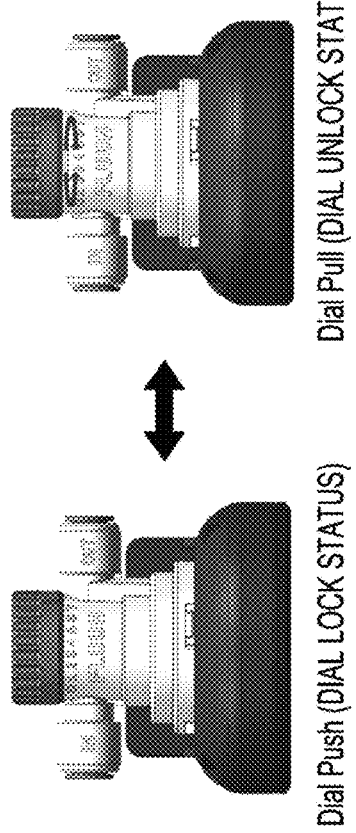
FIG. 9 is a view schematically illustrating an operation of controlling a flow rate of the bypass flow path according to the embodiment of the present invention.
Figure 9:
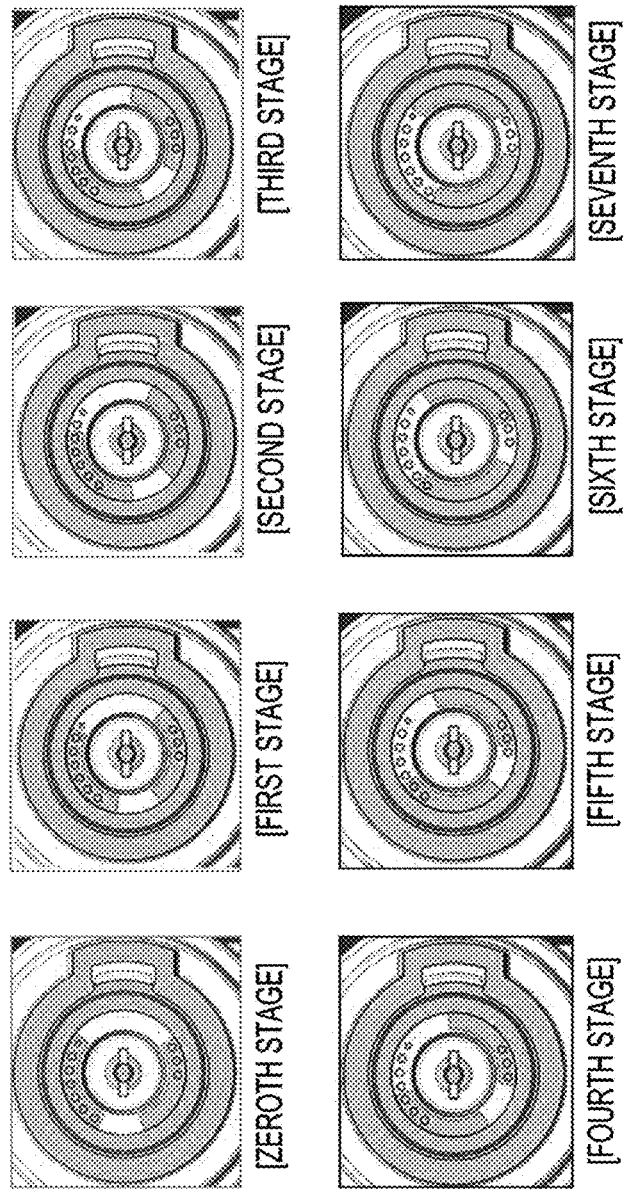

FIG. 8 is a view illustrating the bypass flow path formed in a filter assembly capable of adjusting elimination of solid materials using a flow-variable bypass flow path according to an embodiment, and FIG. 9 is a view schematically illustrating an operation of controlling the flow rate of the bypass flow path shown in FIG. 8.

As shown in the drawings, according to the embodiment of the present invention, the bypass flow rate control unit 300 included in the filter assembly capable of adjusting elimination of solid materials using a flow-variable bypass flow path may adjust an amount of original water flowing into one or more bypass inlet holes 202a formed in a bottom edge of an inner wall of the lower header 202 by controlling the rotational radius of the opening or closing dial 320 which has been described above.

In more detail, according to the embodiment of the present invention, although it is shown in the drawings that up to seven bypass inlet holes 202a in one side are shown and numbers of a variety of cases are shown while being distinguished into 0 to 7 levels according to the number of the sealed bypass inlet holes 202a, the present invention is not limited thereto and a variety of numbers of the bypass inlet holes 202a may be formed.

Here, the flow rate adjusting housing 310 may include the housing blocking member 312, at a certain part of a perimeter of a bottom end surface, which is capable of sealing the inlet holes 202a within a particular range among the one or more bypass inlet holes 202a. In the embodiment of the present invention, the housing blocking member 312 may seal different numbers of the bypass inlet holes 202a in respective stages.

Also, as described above, since the original water flowing through the original water inflow pipe 111 may basically form the first flow path sequentially passing through the solid material elimination filter 140 and the Cl elimination filter 130 and additionally form the second flow path directly passing through the Cl elimination filter 130 without passing the solid material elimination filter 140, when an inflow amount of the original water flowing into the bypass flow pipe 112 is adjusted using the bypass flow rate control unit 300, a flow rate ratio between the first flow path and the second flow path may be adjusted so as to adjust Ca and Mg contents.

As described above, according to the present invention, there is present an effect of providing a filter assembly capable of adjusting a content of solid materials such as Ca ions, Mg ions, and the like included in original water by forming a flow-variable bypass flow path in a filter cartridge header and additionally forming a flow path directly passing through a Cl elimination filter without passing a solid material elimination filter corresponding to the bypass flow path in addition to a flow path basically configured to sequentially pass through a solid material elimination filter and the Cl elimination filter in a filter portion.

Also, according to the present invention, since it is possible to assemble a filter cartridge header using an upper header and a lower header, an effect of easily maintaining and repairing a product may be provided.

Also, according to the present invention, since an inflow amount of original water flowing into a bypass flow path is easily adjusted using an opening or closing dial exposed above a filter cartridge header, an effect of increasing user convenience may be provided.

Also, according to the present invention, since it is possible to implement a push-pull type opening or closing dial in a filter cartridge header and to prevent the opening or closing dial from being separated in operation time and from being rotated when not in operation, an effect of fundamentally preventing any possible malfunction in use.

As described above, according to the present invention, there is present an effect of providing a filter assembly capable of adjusting a content of solid materials such as Ca ions, Mg ions, and the like included in original water by forming a flow-variable bypass flow path in a filter cartridge header and additionally forming a flow path directly passing through a Cl elimination filter without passing a solid material elimination filter corresponding to the bypass flow path in addition to a flow path basically configured to sequentially pass through a solid material elimination filter and the Cl elimination filter in a filter portion.

Also, according to the present invention, since it is possible to assemble a filter cartridge header using an upper header and a lower header, an effect of easily maintaining and repairing a product may be provided.

Also, according to the present invention, since an inflow amount of original water flowing into a bypass flow path is easily adjusted using an opening or closing dial exposed above a filter cartridge header, an effect of increasing user convenience may be provided.

Also, according to the present invention, since it is possible to implement a push-pull type opening or closing dial in a filter cartridge header and to prevent the opening or closing dial from being separated in operation time and from being rotated when not in operation, an effect of fundamentally preventing any possible malfunction in use.

Although the embodiments of the present invention have been described above in detail, the above-described embodiments are merely examples and the present invention is not limited thereto. It will be understood that equivalently substitutable modifications made without departing from the technical concept or filed of the present invention are included in the scope of the present invention.

What is claimed is:

1. A filter assembly capable of adjusting elimination of solid materials using a flow-variable bypass flow path, the filter assembly comprising:

a filter portion which comprises a cover portion formed on top to have a shape in which a bypass flow pipe and a water discharge pipe sequentially surrounds a perimeter of a vertically protruding original water inflow pipe in a stepped structure and accommodates a filter body therein; and a filter cartridge header in which the cover portion of the filter portion is accommodated therebelow and which comprises a bypass flow rate control unit capable of adjusting an inflow amount of original water flowing into the bypass flow pipe, an upper header including a hollow portion forming an inlet portion and an outlet portion in one side and the other side and passes through an inside, and a lower header including one or more bypass inlet holes formed as inflow paths of the original water flowing into the bypass flow pipe on a periphery of a central hole coupled to a bottom of the upper header to pass therethrough, wherein the bypass flow rate control unit in which an inflow amount of the original water flowing into the bypass flow pipe is adjusted stage by stage by adjusting an opening range of the one or more bypass inlet holes by operating a rotational opening or closing dial coupled in a structure sequentially passing through the upper header and the lower header and formed to be exposed in a lid shape outside a top end.

2. The filter assembly of claim 1, wherein the bypass flow rate control unit is configured to adjust an amount of original water flowing into the one or more bypass inlet holes formed inside the lower header by controlling a rotational radius of the rotational opening or closing dial.

3. The filter assembly of claim 2, wherein the bypass flow rate control unit comprises:
   a flow rate adjusting housing which has a top end passing through the upper header and a bottom end located in a place at which the one or more bypass inlet holes of the lower header are formed;
   the rotational opening or closing dial disposed above the upper header and coupled to the top end of the flow rate adjusting housing; and
   a housing supporting spring formed on a periphery of an outer surface of the flow rate adjusting housing and having a repulsive force against inner surfaces of the upper header and the lower header.

4. The filter assembly of claim 3, wherein the flow rate adjusting housing comprises:
   communication holes formed on a side surface to communicate with the inlet portion formed in the upper header to allow original water to flow therein;
   a housing blocking member formed on a bottom end surface and capable of preventing the one or more bypass inlet holes formed in the lower header stage by stage corresponding to a rotational operation of the opening or closing dial; and
   a rotation power transfer portion formed at a top end to receive rotational movement of the rotational opening or closing dial.

5. The filter assembly of claim 4, to couple the upper header to the lower header, comprising:
   a coupling hole portion formed on an outer surface of a bottom end of the upper header; and
   a coupling protruding portion formed to protrude from a side surface of the lower header.

6. The filter assembly of claim 5, wherein the upper header comprises:
   a pair of stoppers formed on an edge of a top surface to perform a holding operation at a uniform interval corresponding to an inner surface of the opening or closing dial; and
   a header-center pipe which is formed to vertically protrude from a central part of the top surface and to form a power transfer space therein for the opening or closing dial and the flow rate adjusting housing and comprises a holding protrusion and a holding step corresponding to a push operation and a pull operation of the opening or closing dial.

7. The filter assembly of claim 6, wherein the opening or closing dial comprises:
   a grip cover which has a lid-shaped exterior and in which a plurality of stopper-corresponding grooves are formed along an inner surface to perform the holding operation of the stoppers and grip slits are formed at certain intervals on an outer surface;
   an insertion portion formed in a vertically downward direction at a central part of an inside of the grip cover to have a tubular shape and inserted into and fixed to the rotation power transfer portion of the flow rate adjusting housing;
   a holding hook, corresponding to the holding protrusion and the holding step formed on the header-center pipe of the upper header, fixed to the holding protrusion when the push operation is performed and held by the holding step and prevented from being externally separated when the pull operation is performed; and
   a rotation prevention member vertically disposed between the holding hook and the grip cover to come into contact with and prevent the stoppers from rotating in the push operation.

8. The filter assembly of claim 1, wherein the filter portion comprises a Cl elimination filter on top and a solid material elimination filter on bottom.

9. The filter assembly of claim 8, wherein the filter portion comprises a first flow path formed such that original water flowing through the original water inflow pipe sequentially passes through the solid material elimination filter and the Cl elimination filter and a second flow path formed such that the original water flowing through the bypass flow pipe directly passes through the Cl elimination filter without passing the solid material elimination filter.

10. The filter assembly of claim 9, wherein when the inflow amount of the original water flowing into the bypass flow pipe is adjusted using the bypass flow rate control unit, a flow rate ratio between the first flow path and the second flow path is adjusted so as to adjust Ca and Mg contents.

* * * * *